United States Patent [19]

Schiteenhelm

[11] Patent Number: 5,006,709

[45] Date of Patent: Apr. 9, 1991

[54] X-RAY DIAGNOSTICS INSTALLATION

[75] Inventor: Rudolf Schiteenhelm, Erlangen, Fed. Rep. of Germany

[73] Assignee: Siemens Aktiengesellschaft, Berlin and Munich, Fed. Rep. of Germany

[21] Appl. No.: 117,573

[22] Filed: Nov. 6, 1987

[30] Foreign Application Priority Data

Jan. 28, 1987 [DE] Fed. Rep. of Germany ....... 3702512

[51] Int. Cl.$^5$ .............................................. G03B 42/02
[52] U.S. Cl. .................................................. 250/327.2
[58] Field of Search ................. 250/327.2 B, 327.2 D, 250/327.2 E, 327.2 F, 484.1 B

[56] References Cited

U.S. PATENT DOCUMENTS

| | | | |
|---|---|---|---|
| 3,975,637 | 8/1976 | Ikedo et al. | 250/327.2 |
| 4,284,889 | 8/1981 | Kato et al. | 250/354.1 |
| 4,517,463 | 5/1985 | Gasiot et al. | 250/327.2 |
| 4,521,904 | 6/1985 | Takano | 378/185 |

FOREIGN PATENT DOCUMENTS

| | | |
|---|---|---|
| 0112204 | 6/1984 | European Pat. Off. . |
| 0129801 | 1/1985 | European Pat. Off. . |
| 2483117 | 11/1981 | France . |
| 267751 | 11/1986 | Japan ............................. 250/327.2 F |

Primary Examiner—Constantine Hannaher
Attorney, Agent, or Firm—Hill, Van Santen, Steadman & Simpson

[57] ABSTRACT

An x-ray diagnostics installation has a luminescent storage screen which stores the latent image of an examination subject disposed in an x-ray beam. The storage screen is capable of stimulated light emission, for readout thereof, and of spontaneous light emission. Emitted light from the storage screen is supplied to a light detector through an imaging system. The storage screen, the imaging system and the light detector form a single unit. An image memory into which signals from the light detector are entered is used to construct an image which is then visually displayed. Entry of the signals from the light detector into the image memory is controlled such that at least one image due to spontaneous light emission of the storage screen is entered in the memory during exposure of the x-ray image, and a further image is entered in the memory during readout of the storage screen, with the images being overlaid in the memory picture element-by-picture element.

6 Claims, 1 Drawing Sheet

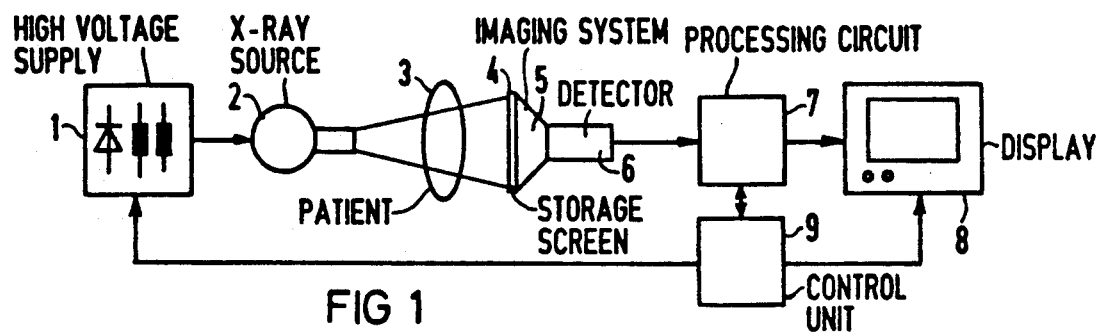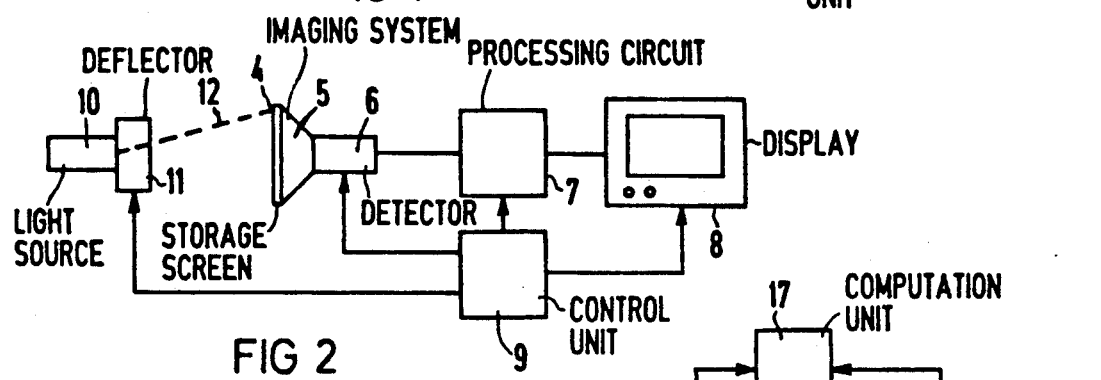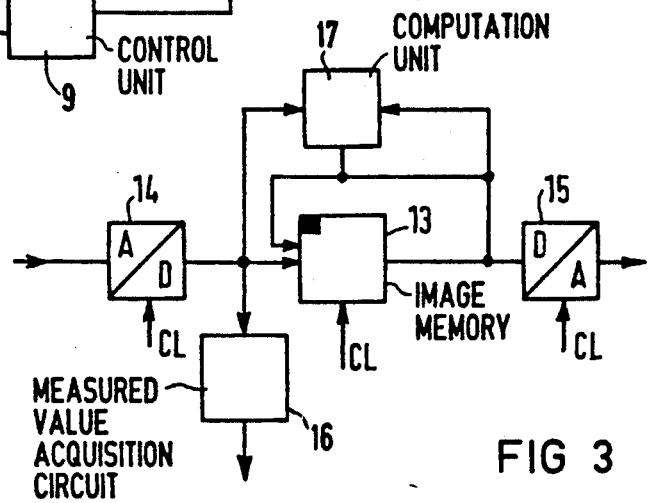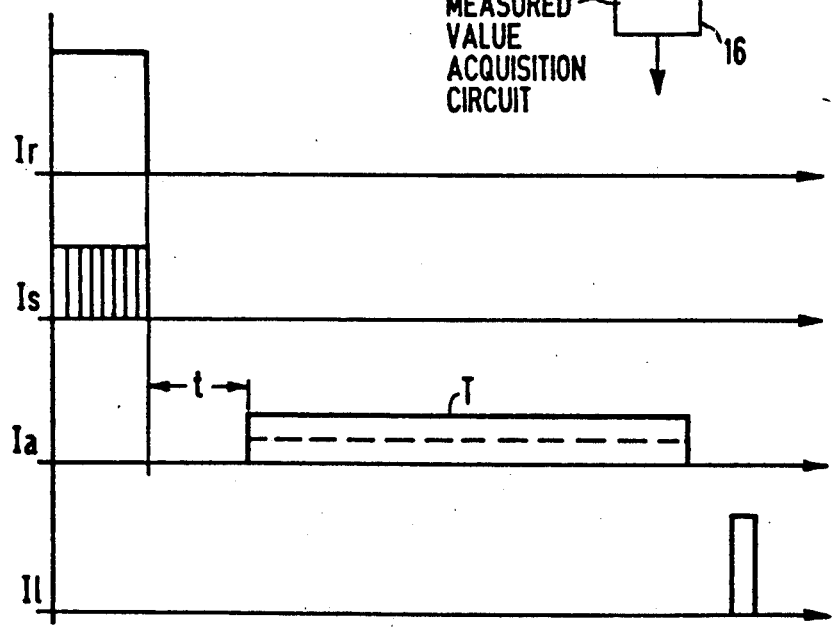

X-RAY DIAGNOSTICS INSTALLATION

BACKGROUND OF THE INVENTION

1. Field of the Invention

The present invention is directed to an x-ray diagnostics installation of the type having a luminescent storage or persistent screen in which a latent x-ray image is stored, means for reading-out the storage screen by exciting the storage screen to luminesce, and an imaging system and a light detector for generating signals corresponding to the image for visual display on a monitor.

2. Description of the Prior Art

An x-ray diagnostics installation is disclosed in German OS No. 24 51 978 wherein a luminescent screen consisting of one or more thermoluminescent storage or persistent luminophores is irradiated with x-rays. The screen functions as a radiation-sensitive transducer, so that electrons are generated, which are stored in voltage traps or wells having a high energy boundary. A read-out means scans the storage screen by picture elements using an additional radiation source, such as a laser, so that the electrons stored in the traps are excited, and can fall back to lower energy levels. The energy difference is emitted in the form of light quanta. The latent x-ray image stored in the screen is read-out in this manner.

During the scanning of a line of the storage screen by a laser beam, the emitted light is acquired by an optical collector, and is imaged onto a light-sensitive entry face of a detector. The output signal of the detector is supplied to a conventional video chain for visual reproduction of the x-ray image.

In order to achieve a fast image read-out, however, the luminophore must also contain a high concentration of traps in which the electrons are not retained, but are spontaneously converted into visible light (spontaneous emission). These traps needed for the read-out event are also occupied with electrons during the x-ray irradiation, and are immediately emptied. This means, however, that a part of the energy of the x-rays is lost during the x-ray exposure, so that only a slight yield of the input energy is obtained.

German OS No. 29 40 454 discloses a method for recording a radiation image on a recording material wherein the spontaneously emitted light of a storage luminophore is acquired by a detector, and is supplied to the x-ray source as a measured value, so that the exposure duration and the level of exposure of the storage luminophore can be controlled thereby. The spontaneously emitted light is thus used only for measurement and control. For the actual image pick-up and image acquisition, again only the relatively slight component of the stored energy is utilized.

SUMMARY OF THE INVENTION

It is an object of the present invention to provide an x-ray diagnostics installation having a luminescent storage screen which permits a higher energy yield in reading-out the stored image than in conventional systems.

The above object is achieved in an x-ray diagnostics installation wherein the storage screen, the imaging system and the detector are combined to form a single unit, with a memory connected to the output of the detector. Entry of data from the detector into the memory is controlled such that at least one image due to spontaneous emission of the storage luminophore is entered into the memory during the exposure of the x-ray image, and one further image is stored in the memory during the actual read-out of the storage screen. The images are overlaid in the memory picture element-by-picture element. In this installation, therefore, at least one image will already be obtained during the x-ray exposure on the basis of the spontaneous emission. As a result of the rigid interconnection of the storage screen, the imaging system and the detector, no problems of congruency arise between the images generated by spontaneous emission and the images generated by stimulated emission during read-out of the storage screen. A substantially complete energy yield is obtained by overlaying the images.

The read-out speed can be increased, or the processing bandwidth can be decreased, by the use of a control unit connected between the read-out device and the detector, the control unit controlling the excitation energy and the scan rate of the read-out device. A simultaneous observation during the exposure can be achieved by connecting the detector, during the exposure of the x-ray image, to a monitor for representing the transillumination images.

The detector is preferably a video pick-up tube or a matrix CCD image transducer. A processing circuit can be provided for enhancing the image if needed.

DESCRIPTION OF THE DRAWINGS

FIG. 1 is a schematic block diagram of an x-ray diagnostics installation constructed in accordance with the principles of the present invention showing components for image reception.

FIG. 2 is a schematic block diagram of an x-ray diagnostics installation constructed in accordance with the principles of the present invention showing components for image read-out and reproduction.

FIG. 3 is a block diagram showing further details of the processing circuit 7 in FIGS. 1 and 2.

FIG. 4 is a set of curves showing the time sequence of events in the x-ray diagnostics installation constructed in accordance with the principles of the present invention.

DESCRIPTION OF THE PREFERRED EMBODIMENTS

The x-ray diagnostics installation shown in FIG. 1 includes a high voltage supply 1 which feeds an x-ray source 2, such as an x-ray tube, which emits x-rays which penetrate a patient 3. The x-rays attenuated by the patient 3 are incident on a luminescent storage screen 4. The incident radiation produces electrons in the storage screen 4, which are stored in voltage traps, so that a latent image of the patient is stored in the screen 4.

At the same time, electrons are excited in the storage screen 4, which immediately fall back from their higher energy level, and thus effect a spontaneous emission. This light emitted due to spontaneous emission is directed by an imaging system 5 onto a light detector 6, for example a video pick-up tube or a matrix CCD transducer. The detector 6 acquires the incoming light, and converts it into an electrical signal which is supplied to a processing circuit 7.

As shown in FIG. 3, the processing circuit 7 includes an image memory 13, an analog-to-digital converter 14, a digital-to-analog converter 15, a measured value acquisition circuit 16, and at least one computation circuit 17.

The image acquired by the detector 6 can be simultaneously reproduced on a display 8 for supervision during the exposure. A control unit 9 is also connected to the processing circuit 7, the monitor 8, and the high-voltage supply 1. The control unit 9 generates clock signals CL (see FIG. 3) for synchronizing operation of the processing circuit 7 and the display 8. At the same time, the measured value acquisition circuit 16 of the processing circuit 7 supplies the control unit 9 with a signal which is used to control the high-voltage supply 1, which in turn controls operation of the x-ray source 2, and may effect disconnection thereof under selected circumstances. Control of the high voltage supply 1 can be undertaken on the basis of points within a region of interest, or over the entire image.

The luminescent storage screen 4 is excited by a light source for reading-out of the latent image, referred to herein as stimulated emission, as opposed to spontaneous emission. The storage screen can be excited simultaneously over its entire area using a suitable illumination source, or may be excited by a light beam source 10, such as a laser. If a beam source is used, the beam is moved across the storage screen 4 by a light deflector 11, which deflects the beam 12 (such as a laser beam) emitted by the light source 10 on a line-by-line format. The deflector 11 may be, for example, a deflecting mirror for vertical deflection, or an electro-optical deflector for the horizontal deflection. As a result of scanning by the beam 12, all picture elements on the storage screen 4 are successively excited line-by-line and caused to luminesce. The imaging system 5 acquires the light emitted by the storage screen 4, and conducts the light onto the detector 6, which measures the intensity of the scanned picture elements, and generates a corresponding electrical signal which is supplied to the processing circuit 7. The processing circuit 7 generates a video signal from the analog output signals of the detector 6 for display on the monitor 8. During reproduction of the latent image, the control unit 9 synchronizes operation of the deflector 11, the processing circuit 7 and the display 8.

The image pick-up and reproduction events shall be set forth in greater detail below with reference to the curves shown in FIG. 4. The intensity Ir of the x-rays is entered in the first curve over time. The second curve shows the intensity Is of the spontaneously emitted light supplied to the detector 6. The intensity Ia of the stimulated emitted light is shown over time in the third curve. The fourth curve shows a quench pulse having an intensity Il.

At the beginning of an exposure, the high voltage supply is switched on, so that the x-ray source 2 emits x-rays having the intensity Ir. The storage screen 4 spontaneously emits light having the intensity Is, which is supplied by the imaging system 5 to the detector 6. The detector 6 scans the spontaneously emitted light with a normal scan rate, with the individual picture elements being stored in the image memory 13 of the processing circuit 7. The picture elements can be stored such that each picture element has a separate storage location, or the picture elements can be read into one storage location in integrating fashion by the computation circuit 17.

The measured value acquisition circuit 16 in the processing circuit 7 and the control unit 9 function in combination as an automatic exposure unit so that the spontaneously emitted light is acquired and the high voltage supply is switched off, thereby discontinuing generation of x-rays. This effects a pause t. Depending upon the type of luminophore used in the storage screen 4, the pause t may be a number of hours, or even days. Subsequently, the storage screen 4 is excited over the time span T with stimulating radiation having an intensity Ia, with the stimulated light emitted by the storage screen 4 again being acquired by the detector 6. The output of the detector 6 is again entered into the image memory 13. After read-out has been completed, the storage screen 4 is completely illuminated with light having the intensity Il, so that any electrons still held in the traps will fall completely back to the lower energy level, and the information previously stored in the screen 4 is completely quenched. The unit can now again be used for image reception.

The individual images obtained from the spontaneous and stimulated emission stored in the image memory 13 are separately processed in the computation circuit 17, and are overlaid (or superimposed) and reproduced on the display 8. The image on the display 8 may be permanently retained in a hard copy, or can be stored in a further memory for later analysis in a known manner.

Although modifications and changes may be suggested by those skilled in the art it is the intention of the inventor to embody within the patent warranted hereon all changes and modifications as reasonably and properly come within the scope of his contribution to the art.

I claim as my invention:

1. An x-ray diagnostics installation for examining a patient comprising:

means for generating x-radiation directed at said patient;

a luminescent storage screen on which x-radiation attenuated by said patient is incident, said storage screen being capable of spontaneous and stimulated emission of light corresponding to an x-ray image of said patient;

means for reading-out the image from said storage screen by exciting said storage screen with stimulating radiation;

means for detecting light emitted by said storage screen;

means for imaging light from said storage screen onto said means for detecting light, said storage screen, said means for imaging, and said means for detecting light being combined in a single unit;

an image memory in which signals from said means for detecting light are stored picture element-by-picture element;

means for controlling entry of signals into said image memory, said means for controlling entering first signals from said means for detecting light, resulting from spontaneous emission of said storage screen, into said image memory during an exposure of said patient with x-radiation, and thereafter entering second signals from said means for detecting light, resulting from stimulated read-out of said storage screen, in said image memory, and overlaying said first and second signals picture element-by-picture element; and means for displaying an image of the overlaid first and second signals.

2. An x-ray diagnostics installation as claimed in claim 1, wherein said means for reading-out includes means for scanning said storage screen with said stimulating radiation at a scan rate, and further comprising means connected to the output of said means for detecting light for controlling the excitation energy of said stimulating radiation and said scan rate based on the output of said means for detecting light.

3. An x-ray diagnostics installation as claimed in claim 1, wherein said means for detecting light is connected to said means for displaying such that a transillumination image of said patient is shown on said means for displaying during said exposure of said patient.

4. An x-ray diagnostics installation as claimed in claim 1, wherein said means for detecting light is a video-pick-up tube.

5. An x-ray diagnostics installation as claimed in claim 1, wherein said means for detecting light is a matrix CCD image transducer.

6. An x-ray diagnostics installation as claimed in claim 1, wherein said image memory is part of a processing circuit connected between said means for detecting light and said means for displaying, and wherein said processing circuit includes means for separately processing said first and second signals.

* * * * *